March 16, 1948.　　T. H. WHALEY　　2,437,773
PROCESS FOR THE PRODUCTION OF DIOLEFINS
Filed Jan. 7, 1944
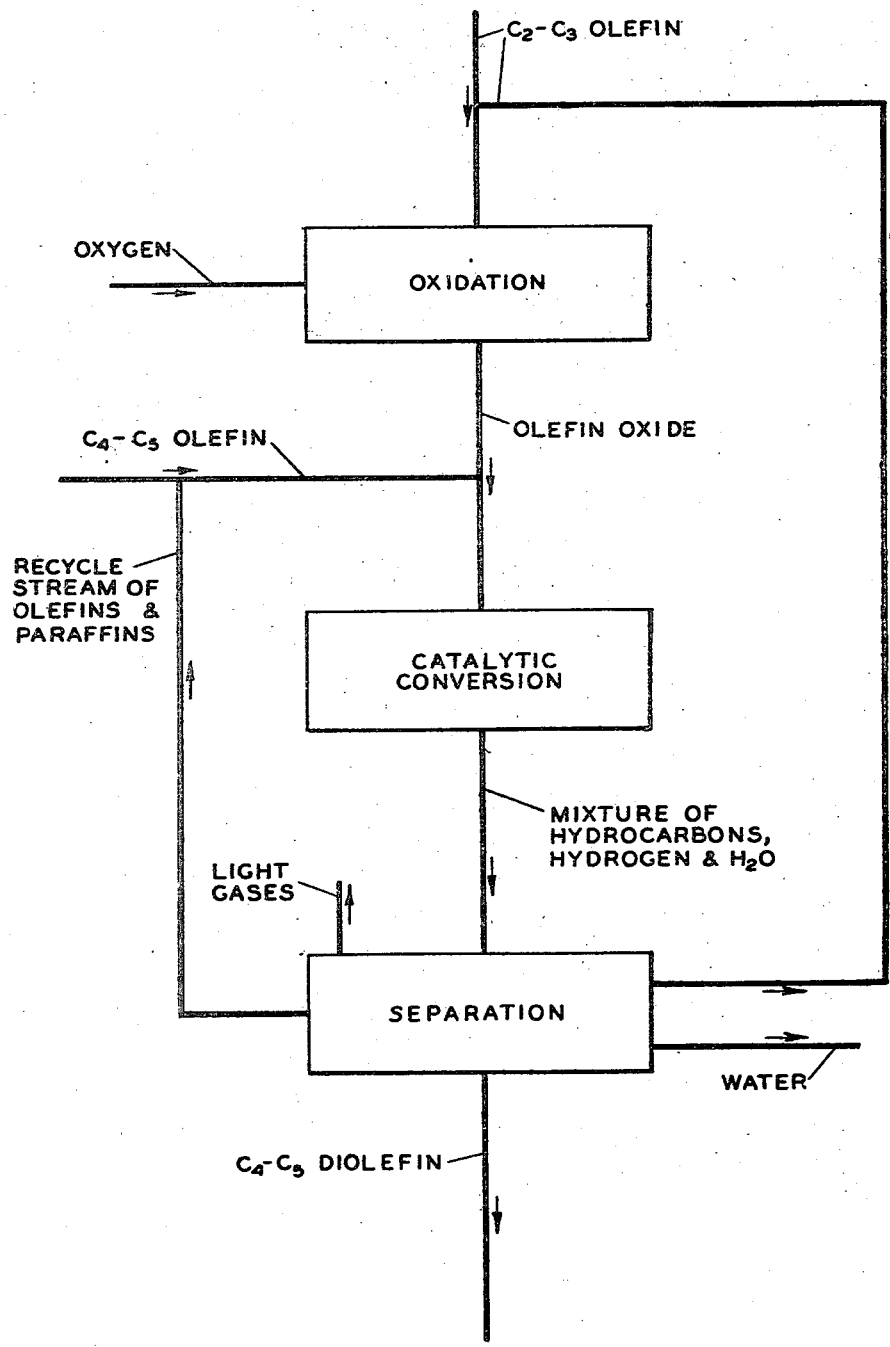
INVENTOR
T. H. WHALEY
BY
ATTORNEYS Patented Mar. 16, 1948

2,437,773

UNITED STATES PATENT OFFICE 2,437,773

PROCESS FOR THE PRODUCTION OF DIOLEFINS

Thomas H. Whaley, Bartlesville, Okla., assignor to Phillips Petroleum Company, a corporation of Delaware Application January 7, 1944, Serial No. 517,451

13 Claims. (Cl. 260—681)

The present invention relates to an improved process for the production of diolefins. The process of this invention is particularly useful for the manufacture of butadiene.

It is well known that conjugated diolefins of four and five carbon atoms per molecule may be produced by the dehydrogenation of the corresponding olefin. Butadiene is the most important diolefin being produced by this method at the present time. The present invention involves dehydrogenation of olefins to diolefins and results in an improved yield of diolefins from the olefins supplied to the process. The process involves dehydrogenation of olefins in combination with conversion of low boiling hydrocarbons of two and three carbon atoms per molecule to diolefins by a new and useful process.

An object of this invention is to provide an improved process for the production of diolefins.

Another object of this invention is to provide a process in which diolefins are produced from a variety of olefins.

Another object of this invention is to provide a process in which olefins of two to five carbon atoms per molecule are simultaneously converted to diolefins of four to five carbon atoms per molecule.

Still another object of this invention is to provide an improved process in which the production of diolefins by dehydrogenation of olefins is promoted by the simultaneous conversion of an olefin oxide to diolefins.

Still another object of this invention is to provide a process for the production of butadiene from ethylene and butenes.

The process of the present invention is illustrated in the accompanying drawing which is a self-explanatory diagrammatic flow sheet.

By the present process olefins of four to five carbon atoms per molecule are dehydrogenated to diolefins under conditions which are particularly favorable to the dehydrogenation reaction. At the same time additional diolefins are produced by a concurrent reaction in which an olefin oxide is converted to diolefins. In accordance with the invention, a lower molecular weight olefin, ethylene or propylene, and oxygen are reacted to form the olefin oxide. The olefin oxide is admixed with an olefin of higher molecular weight and passed to a conversion zone in which the higher molecular weight olefin is dehydrogenated to the diolefin. Simultaneously the olefin oxide acts as hydrogen acceptor to promote the dehydrogenation reaction and enters into a condensation reaction with the olefin so formed to produce additional diolefins. The process has the novel advantage of utilizing olefins of different molecular weight to produce the same diolefin as product.

The catalytic dehydrogenation of butenes to butadiene is most advantageously carried out at temperatures within the range of 900 to 1350° F. Optimum temperature conditions are dependent upon the catalyst employed and upon other operating conditions. Low pressures are advantageous to the dehydrogenation reaction. Experimentally, very low subatmospheric pressure has been found to be most favorable. Practically, however, many difficulties are experienced when subatmospheric pressure operation is attempted on the large scale necessary for commercial production. As an alternative to low absolute pressure, it is often expedient to operate at a total pressure which may be reasonably attained and to maintain the partial pressure of the reactants low. This may be accomplished by admixing a sufficient quantity of a relatively inert diluent with the reactants to obtain the desired low partial pressure of the reactants. Thus, the total pressure at which the reaction is carried out may be atmospheric or somewhat higher, as desired, while the reaction is influenced as if a low absolute pressure were employed. Various diluents may be used for this purpose among which are low boiling hydrocarbons, nitrogen, carbon dioxide, flue gases and steam. In selecting the diluent care should be taken that one be chosen that does not adversely affect the reaction or the catalyst. For example, steam should not be employed with catalysts which are water sensitive.

The dehydrogenation of olefins may be carried out non-catalytically by pyrolysis in open tubes or by contact with heated masses of inert material, such as pieces of broken quartz. Non-catalytic dehydrogenation of olefins is not generally practical for commercial operations. At the temperatures required to obtain satisfactory reaction rates undesirable side reactions take place to such an extent that unsatisfactory yields of diolefins are obtained. Excessive cracking is responsible for large losses of olefins.

Various dehydrogenation catalysts are known. Nickel is a very active catalyst but has not been widely used due to the fact that it tends to promote cracking as well as dehydrogenation. Many other metals and alloys are known to have a catalytic effect for the dehydrogenation of hydrocarbons. Metal oxides have been proposed, particularly difficultly reducible metal oxides of the third, fourth, fifth and sixth group of the periodic table. Among the most satisfactory are the oxides of aluminum and chromium. Aluminum oxide or bauxite is satisfactory at temperatures within the range of 1100 to about 1400° F. Chromium oxide is a more active catalyst and is usually used in a minor proportion admixed with or supported on a suitable carrier.

To promote the dehydrogenation reaction, hydrogen acceptors have been found useful. The hydrogen acceptor reduces the concentration of free hydrogen in the reaction zone, increasing the velocity of the dehydrogenation reaction in accordance with the law of mass action. To be effective, the hydrogen acceptor must be hydrogenated in preference to the reaction products and must not be dehydrogenated to any appreciable extent under the operating conditions. It is known that unsaturated hydrocarbons having fewer carbon atoms than the hydrocarbon dehydrogenated may be used as hydrogen acceptors. For example, ethylene has been named as a satisfactory hydrogen acceptor in dehydrogenating propane or butane.

In the process of the present invention ethylene, propylene or a mixture of these low molecular weight olefins is subjected to conditions effecting conversion of at least a part of the olefin to the corresponding olefin oxide. These olefins may be produced by well known cracking operations and may be purified to any desired extent prior to use in the present process. The term "low molecular weight olefin" wherever used herein shall be understood to mean an olefin having two to three carbon atoms per molecule, as distinguished from olefins having four or more carbon atoms per molecule which latter may be dehydrogenated to conjugated diolefins.

The low molecular weight olefin may be converted to the olefin oxide by catalytic oxidation. The olefin and oxygen, admixed with an inert diluent gas, are contacted with an oxidation catalyst in apparatus provided with means for controlling the temperature of the exothermic reaction. Preferably the catalyst comprises silver deposited on an adsorbent carrier. The catalyst is in the form of pellets arranged in tubes of relatively small cross sectional area which may be surrounded with cooling medium. Preferably the reaction temperature is maintained within the range of about 600 to 800° F. In the present process the conversion of the low molecular weight olefins to olefin oxides may be carried out in any suitable manner and is not necessarily limited to the more or less conventional practice outlined above.

The effluent from the oxidation step comprises the olefin oxide, unreacted olefin, carbon dioxide and water vapor. The olefin oxide may be recovered from the effluent and purified in known manner. While it is preferred that the olefin oxide be separated from the unconverted olefin prior to use in the subsequent conversion step, it is not essential for successful operation of the process of this invention to concentrate and purify the olefin oxide. The effluent of the oxidation step may be passed directly to the dehydrogenation step. Generally it is desirable that both the olefin oxide and the corresponding low molecular weight olefin be present in the feed to dehydrogenation step. The low molecular weight olefin used in making up the charge for the conversion step may, however, be conveniently obtained by recycling from the effluent of the conversion step.

In the process of the present invention the olefin to be dehydrogenated to the diolefin is admixed with the olefin oxide and diluents to form the charge stock to the conversion step. The low molecular weight olefin and paraffin, corresponding to the olefin oxide, are preferred diluents. Thus when ethylene oxide is admixed with butylene in forming the feed stock for the conversion step, a mixture of ethylene and ethane is preferred as diluent. The low molecular weight olefin, e. g., ethylene, may conveniently be obtained, in part at least, from the effluent of the dehydrogenation step as will be apparent hereinafter.

The conversion step is carried out at relatively low pressure within the range of about one half to eight atmospheres; preferably at near-atmospheric pressure. The temperature is preferably within the range of 1100° F. to 1300° F. although temperatures up to 1400° F. may be employed. Space velocities may vary widely, preferably the flow rate is within the range of 1000 to 1500 volumes per volume of catalyst per hour. The hydrocarbon mixture comprising the olefin to be dehydrogenated to the diolefin in admixture with the oxide of a low molecular weight olefin is contacted with a bauxite catalyst under the conditions outlined above. This effects dehydrogenation of the olefin of four to five carbon atoms per molecule to produce the corresponding diolefin. The olefin oxide reacts with hydrogen to yield the corresponding low molecular weight olefin and water vapor. Simultaneously the olefin oxide and the low molecular weight olefin react to form diolefin hydrocarbons. Also the low molecular weight olefin may be hydrogenated to some extent to yield the corresponding paraffin. Control of these reactions is had by control of the initial feed composition. The relative proportions of the olefin oxide, the low molecular weight olefin and the corresponding paraffin in the feed are readily controlled. The concentrations of these various materials in the conversion zone influence the rate and extent of the various reactions as will be apparent to those skilled in the art. Preferably the paraffin corresponding to the olefin from which the olefin oxide is derived is present in the conversion zone in a concentration sufficient to prevent appreciable hydrogenation of the low molecular weight olefin to said corresponding paraffin. A range of about five to about twenty volume per cent olefin oxide in the feed is preferred.

The preferred catalyst for use in the conversion zone comprises bauxite impregnated with the oxide or hydroxide of barium or strontium. A very satisfactory catalyst may be prepared by calcining iron-free bauxite and spraying the calcined bauxite with a solution of the hydroxide of barium or strontium. Instead of a solution of the hydroxide of barium or strontium, a solution of one of the salts may be used with subsequent conversion to the hydroxide. The hydroxide of barium or strontium may be converted to the oxide at high temperatures. In either form the resultant catalyst has the desirable properties of promoting the dehydrogenation reaction while suppressing cracking and polymerization reactions. The catalyst is water resistant, i. e., it is not unfavorably affected by the presence of water vapor in the feed or reactants and long catalyst life may be expected. In practice the barium salt is preferred. The amount of the barium salt may vary. The range of about one to about ten per cent by weight barium hydroxide or its equivalent represents the practical limits. About five per cent barium hydroxide by weight is preferred for the dehydrogenation step of the present invention. The preparation of a catalyst of this type is disclosed in the copending application of Schulze et al., Serial No. 353,961, filed August 23, 1940, now U. S. Patent 2,380,876, issued July 31, 1945. Both the olefin oxide and the low molecular weight olefin are potential hydrogen acceptors. Each molecule of the olefin oxide converted to the corresponding olefin removes one molecule of hydrogen from the reaction products. Similarly, each molecule of olefin converted to the corresponding paraffin requires one molecule of hydrogen. This latter reaction is undesirable in the present process.

Ethylene and ethylene oxide combine in equimolecular proportions to form butadiene under the conditions employed. This reaction accounts for a part of the butadiene in the reaction products. Theoretically, half the butadiene could be produced from the ethylene oxide if all the hydrogen liberated were reacted with ethylene oxide and all the ethylene as formed reacted with ethylene oxide to form butadiene. Practically, however, the reaction takes place to a considerably lesser extent than does the dehydrogenation reaction. While theoretically the olefin oxide might react with the higher molecular weight olefins, for example reaction between ethylene oxide and butylenes to form diolefins of six carbon atoms, under the conditions employed herein this reaction takes place, if at all, to a very minor extent.

The present invention, therefore, provides a process by which diolefins are produced in a novel step involving a combination of dehydrogenation of olefins combined with a condensation reaction of an olefin and an olefin oxide. An important advantage of the present invention resides in the fact that it provides a process wherein olefins of two to five carbon atoms may be converted to diolefins of four to five carbon atoms per molecule in a minimum of reaction zones.

The effluents of the conversion step comprise the diolefin produced, water vapor, hydrogen, unreacted hydrocarbons and decomposition products in the form of light gases. Hydrogen and light gases are removed in an amount equivalent to the amount formed per pass through the conversion zone, the diolefin is removed as product, and the remaining gas may be recycled to the conversion step for admixture with fresh reactants. Preferably, all the paraffin corresponding to the olefin of low molecular weight is recycled. At least part of the olefin of low molecular weight is separated from the effluent of the conversion zone and may advantageously be passed to the oxidation zone for reconversion to the olefin oxide.

In one specific embodiment of my invention, ethylene is admixed with air and steam and passed to an oxidation zone into contact with a supported silver catalyst at a temperature of 650 to 700° F. The ethylene oxide is separated from the effluents and admixed with fresh butylenes and a recycle stream from the dehydrogenation zone. The resulting mixture is passed into contact with a catalyst comprising bauxite impregnated with a minor proportion of barium hydroxide at a pressure of five pounds per square inch gauge, a temperature of 1300° F. and at a space velocity of 1200 gas volumes per volume of catalyst per hour. The feed mixture contains about twenty volume per cent butenes and about fifteen volume per cent ethylene oxide. The total effluent contains about five per cent butadiene. The light gases are separated from the effluents and discarded. A $C_2$ fraction is separated from the remaining effluent and, after separation of part of the ethylene, is recycled to the conversion zone. The excess ethylene is passed to the oxidation zone for reconversion to ethylene oxide. Unconverted butylenes are recycled to the conversion zone.

Propylene oxide or a mixture of the oxides of ethylene and propylene may be used in the foregoing specific embodiment of the invention. The diolefin formation in this event is not as selective as in the case ethylene oxide alone is used and $C_5$ diolefins are formed as well as butadiene.

In the production of $C_5$ diolefins, the $C_5$ olefins are dehydrogenated in the conversion step and ethylene oxide, propylene and propane are admixed with the $C_5$ olefin to form the feed to the conversion zone. Conditions are approximately the same as for production of butadiene. A mixture of the oxides of ethylene and propylene, together with the corresponding olefins and paraffins, may be used for admixture with the $C_5$ olefins in preparing the charge stock for the conversion to diolefins. A mixture of butadiene and $C_5$ diolefins results. Either of the olefin oxides or a mixture of the two is highly effective as hydrogen acceptor for the dehydrogenation reaction in which either the $C_4$ or $C_5$ olefin is dehydrogenated to the diolefin.

I claim:

1. A process for the production of butadiene which comprises forming a mixture comprising ethylene oxide and butylene, and passing the mixture to a conversion zone at a temperature within the range of 1100 to 1300° F. into contact with a dehydrogenation catalyst comprising bauxite impregnated with barium hydroxide.

2. A process for the production of butadiene which comprises admixing ethylene with an oxygen-containing gas; passing the resulting mixture to an oxidation zone into contact with an oxidation catalyst under conditions suitable for conversion of the ethylene to ethylene oxide; forming a second mixture comprising ethylene oxide effluent of said oxidation zone and butylene; passing the second mixture to a conversion zone at a temperature within the range of 1100 to 1300° F. into contact with a dehydrogenation catalyst comprising bauxite; withdrawing effluent comprising butadiene, butylene, ethylene oxide, ethylene, and ethane from the conversion zone; separating butadiene from the effluent of the conversion zone; separating ethylene from the effluent of the conversion zone and passing same to the oxidation zone; and recycling ethane together with unconverted ethylene oxide and butylene to the conversion zone as part of said second mixture.

3. A process for the production of butadiene which comprises forming a feed mixture comprising ethylene oxide and butylene; passing said feed mixture to a conversion zone at a temperature within the range of 1100 to 1300° F. into contact with a catalyst comprising bauxite impregnated with barium hydroxide; withdrawing effluent comprising butadiene, ethane, unconverted butylene and ethylene oxide from the conversion zone; separating butadiene from the effluent as product; and recycling ethane, butylene, and ethylene oxide to the conversion zone as part of said feed mixture.

4. A process for the production of butadiene which comprises forming a mixture comprising ethylene oxide and butylene, and passing the mixture to a conversion zone into contact with a dehydrogenation catalyst comprising bauxite impregnated with barium hydroxide under conditions effecting conversion of ethylene oxide and butylene to butadiene.

5. A process for the production of a diolefin of four to five carbon atoms per molecule from olefins of two to five carbon atoms per molecule, which comprises passing an olefin of two to three carbon atoms per molecule to an oxidation zone under such conditions as to effect conversion to the olefin oxide; passing said olefin oxide in admixture with an olefin of four to five carbon atoms per molecule to a conversion zone into contact with a dehydrogenation catalyst under such conditions as to effect dehydrogenation of said four to five carbon atom olefin to diolefin, reduction of said olefin oxide to olefin, and condensation of resulting low molecular weight olefin with olefin oxide to form diolefin, olefin oxide also functioning in said dehydrogenation as a hydrogen acceptor; separating olefins of two to three carbon atoms per molecule from the effluent from said conversion zone; and recycling said last named olefins to said oxidation zone.

6. A process for the production of a diolefin of four to five carbon atoms per molecule which comprises forming a mixture comprising an olefin oxide of two to three carbon atoms per molecule and an olefin of four to five carbon atoms per molecule, and passing the mixture to a conversion zone into contact with a dehydrogenation catalyst under such conditions as to effect dehydrogenation of said olefin of four to five carbon atoms to diolefin, reduction of said olefin oxide to olefin, and condensation of resulting low molecular weight olefin with olefin oxide to form diolefin, olefin oxide also functioning in said dehydrogenation as a hydrogen acceptor.

7. A process for the production of butadiene which comprises forming a mixture comprising ethylene oxide and butylene, and passing the mixture to a conversion zone into contact with a dehydrogenation catalyst under such conditions as to effect dehydrogenation of butylene to butadiene, reduction of ethylene oxide to ethylene, and condensation of ethylene with ethylene oxide to form butadiene, olefin oxide also functioning as a hydrogen acceptor in said dehydrogenation.

8. A process for the production of a diolefin of four to five carbon atoms per molecule which comprises forming a mixture comprising an olefin of four to five carbon atoms per molecule, an olefin oxide of two to three carbon atoms per molecule, and a paraffin having the same number of carbon atoms as the olefin oxide; and passing the resulting mixture at a temperature within the range of about 1100 to about 1400° F. into contact with a dehydrogenation catalyst under such conditions as to effect simultaneous dehydrogenation of said olefin to the corresponding diolefin and conversion of the olefin oxide to diolefin, olefin oxide functioning as a hydrogen acceptor for said dehydrogenation thereby increasing the yield of diolefin.

9. A process for the production of butadiene which comprises forming a feed mixture comprising butylene, ethylene oxide, and ethane; passing said mixture at a temperature within the range of about 1100 to about 1400° F. into contact with a dehydrogenation catalyst in a conversion zone under such conditions as to effect simultaneous dehydrogenation of butylene to butadiene and conversion of ethylene oxide to butadiene, ethylene oxide functioning as a hydrogen acceptor in said dehydrogenation; withdrawing effluent comprising butadiene and ethane; separating butadiene from said effluent as product; and recycling a substantial portion of the ethane in said effluent to the conversion zone as part of said feed mixture.

10. A process for the production of butadiene which comprises forming a mixture comprising butylene, ethylene oxide, and ethane in amount at least equal to that required for equilibrium with ethylene at the temperature prevailing in the conversion zone hereinafter defined; and passing the resulting mixture at a temperature within the range of about 1100 to about 1400° F. into contact with a dehydrogenation catalyst in a conversion zone under such conditions as to effect dehydrogenation of butylene to butadiene and conversion of ethylene oxide to butadiene, ethylene oxide also functioning as a hydrogen acceptor in said dehydrogenation.

11. A process for the production of a diolefin of four to five carbon atoms per molecule which comprises admixing an olefin of two to three carbon atoms per molecule with an oxygen-containing gas; passing the resulting mixture to an oxidation zone into contact with an oxidation catalyst under conditions which effect conversion of said olefin to the olefin oxide; forming a second mixture comprising olefin oxide from said oxidation zone and an olefin of four to five carbon atoms per molecule; passing the second mixture to a conversion zone at a temperature within the range of about 1100 to about 1300° F. into contact with a dehydrogenation catalyst comprising bauxite under such conditions as to effect dehydrogenation of said olefin of four to five carbon atoms per molecule to diolefin wherein said olefin oxide functions as a hydrogen acceptor to aid said dehydrogenation; withdrawing effluent comprising diolefin, olefin, and olefin oxide; separating diolefin from the effluent of the conversion zone; separating olefin of two to three carbon atoms per molecule from the effluent of the conversion zone and passing same to the oxidation zone; and recycling olefin of four to five carbon atoms per molecule together with unconverted olefin oxide to the conversion zone as part of said second mixture.

12. A process for the production of pentadiene which comprises forming a mixture comprising an olefin oxide of two to three carbon atoms per molecule and pentene, and passing the mixture to a conversion zone into contact with a dehydrogenation catalyst under such conditions as to effect dehydrogenation of the pentene to pentadiene as the principal reaction of the process, reduction of a portion of the olefin oxide to olefin, and condensation of low-boiling olefin with olefin oxide to form diolefin, the olefin oxide functioning as a hydrogen acceptor in said dehydrogenation.

13. A process for the production of butadiene which comprises forming a mixture comprising propylene oxide and butylene, and passing the mixture to a conversion zone at a temperature within the range of about 1100 to about 1400° F. into contact with a dehydrogenation catalyst under such conditions as to effect dehydrogenation of butylene to butadine as the principal reaction of the process, reduction of a portion of the propylene oxide to propylene, and condensation of propylene with propylene oxide to form diolefin, said propylene oxide functioning as a hydrogen acceptor in said dehydrogenation.

THOMAS H. WHALEY.

REFERENCES CITED

The following references are of record in the file of this patent:

UNITED STATES PATENTS

| Number | Name | Date |
|---|---|---|
| 1,998,878 | Lefort | Apr. 23, 1935 |
| 2,131,089 | Beeck et al. | Sept. 27, 1938 |
| 2,209,215 | Wiezevich | July 23, 1940 |
| 2,284,468 | Burk et al. | May 26, 1942 |
| 2,326,258 | Schmidt et al. | Aug. 10, 1943 |
| 2,343,712 | Ruthruff | Mar. 7, 1944 |
| 2,376,986 | Shoemaker | May 29, 1945 |